US012728801B2

(12) United States Patent
Wendel

(10) Patent No.: US 12,728,801 B2
(45) **Date of Patent: *Sep. 8, 2026**

(54) SENSOR POD WITH USER INTERFACE

(71) Applicant: Kodiak Robotics, Inc., Mountain View, CA (US)

(72) Inventor: Andreas Wendel, Mountain View, CA (US)

(73) Assignee: Kodiak Robotics, Inc., Mountain View, CA (US)

(*) Notice: Subject to any disclaimer, the term of this patent is extended or adjusted under 35 U.S.C. 154(b) by 312 days.

This patent is subject to a terminal disclaimer.

(21) Appl. No.: 18/117,330

(22) Filed: Mar. 3, 2023

(65) Prior Publication Data

US 2024/0294124 A1 Sep. 5, 2024

(51) Int. Cl.
*B60R 11/04* (2006.01)
*B60W 60/00* (2020.01)
*B60R 11/00* (2006.01)

(52) U.S. Cl.
CPC ........... *B60R 11/04* (2013.01); *B60W 60/001* (2020.02); *B60R 2011/004* (2013.01); *B60W 2420/403* (2013.01); *B60W 2420/408* (2024.01)

(58) Field of Classification Search
CPC ............................ B60R 11/04; B60W 60/001
See application file for complete search history.

(56) References Cited

U.S. PATENT DOCUMENTS 7,446,650 B2 * 11/2008 Scholfield .............. B60Q 1/543 348/148
8,670,035 B2 * 3/2014 Robert ..................... B60R 1/26 348/148
10,086,763 B2 * 10/2018 Parat ....................... B60R 1/002
10,741,110 B2 * 8/2020 Kanaguchi ............... B60Q 1/50
12,250,448 B2 * 3/2025 Schubert ............. G06V 40/164
2003/0147542 A1 * 8/2003 Hosono ............... B60R 11/0247 381/301
2005/0187675 A1 * 8/2005 Schofield .................. B60R 1/12 701/1
2008/0273715 A1 * 11/2008 Snider ................ B60R 11/0217 381/86
2010/0197359 A1 8/2010 Harris
2011/0149077 A1 * 6/2011 Robert ...................... B60R 1/12 348/148
2015/0334345 A1 * 11/2015 Fichera .................. H04N 7/142 348/14.01
2015/0358471 A1 12/2015 Roth et al.
2017/0259753 A1 9/2017 Meyhofer
(Continued)

FOREIGN PATENT DOCUMENTS

WO 2020/180707 A1 9/2020

OTHER PUBLICATIONS

U.S. Appl. No. 18/117,335, filed Mar. 3, 2022.
(Continued)

*Primary Examiner* — Olisa Anwah
(74) *Attorney, Agent, or Firm* — Michele V. Frank; Venable LLP

(57) ABSTRACT

An autonomous vehicle includes a sensor pod having a mirror, a connecting assembly extending between the sensor pod and the autonomous vehicle, and a user interface provided on the sensor pod. The user interface is configured to provide two-way communication between a local user and a remote user.

23 Claims, 4 Drawing Sheets

(56) References Cited

U.S. PATENT DOCUMENTS

| | | | | |
|---|---|---|---|---|
| 2017/0347067 | A1* | 11/2017 | Bostrom | G06V 20/59 |
| 2018/0022278 | A1 | 1/2018 | Parat | |
| 2018/0337703 | A1* | 11/2018 | Price | H01Q 1/3266 |
| 2020/0101981 | A1 | 4/2020 | Phillips et al. | |
| 2020/0284883 | A1* | 9/2020 | Ferreira | G01S 7/4815 |
| 2020/0406834 | A1* | 12/2020 | Russell | B60W 30/12 |
| 2021/0061224 | A1* | 3/2021 | Kim | H04W 12/06 |
| 2021/0211614 | A1* | 7/2021 | Pritchard | G08G 1/0112 |
| 2022/0219610 | A1* | 7/2022 | Solar | H04N 21/4788 |
| 2023/0104622 | A1* | 4/2023 | Schubert | H04N 23/62<br>348/14.03 |
| 2023/0303103 | A1* | 9/2023 | Ramaprasad | G01V 1/001 |
| 2023/0391290 | A1* | 12/2023 | Gaither | B60R 25/10 |
| 2024/0098464 | A1* | 3/2024 | Foy | H04N 7/181 |

OTHER PUBLICATIONS

U.S. Appl. No. 17/826,043, filed May 26, 2022.

International Search Report and Written Opinion mailed Jun. 10, 2024, directed to International Patent Application No. PCT/US2024/018220; 19 pages.

Final Rejection dated Aug. 29, 2025, directed to U.S. Appl. No. 18/117,335; 14 pages.

Non-Final Rejection dated Feb. 25, 2025, directed to U.S. Appl. No. 18/117,335; 12 pages.

* cited by examiner

SENSOR POD WITH USER INTERFACE

CROSS REFERENCE TO RELATED APPLICATIONS

The present application is related to co-pending U.S. application Ser. No. 18/117,335, filed Mar. 3, 2023, the entire contents of which are hereby incorporated by reference in their entireties.

TECHNICAL FIELD

The present disclosure relates to a sensor pod with user interface.

BACKGROUND

Vehicles may be operated autonomous or semi-autonomously. Control systems may be employed to control operation of the vehicle.

BRIEF SUMMARY

According to an embodiment, an autonomous vehicle includes a sensor pod having a mirror, a connecting assembly extending between the sensor pod and the autonomous vehicle, and a user interface provided on the sensor pod. The user interface is configured to provide two-way communication between a local user and a remote user.

According to an embodiment, a sensor pod is configured to be coupled to a vehicle, the sensor pod includes a forward facing surface and a rearward facing surface, a mirror located on the rearward facing surface, and a user interface having a display surface, the display surface located on the rearward facing surface. The user interface is configured to provide two-way communication between a local user and a remote user.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Various embodiments are discussed in detail below. While specific embodiments are discussed, this is done for illustration purposes only. A person skilled in the relevant art will recognize that other components and configurations may be used without departing from the spirit and scope of the present disclosure.

The terms "forward" and "rearward" refer to relative positions of a vehicle. For example, forward refers to a position closer to front hood, front bumper, or front fender of the vehicle and rearward refers to a position closer to a rear bumper, rear trunk, or trailer of the vehicle.

The terms "coupled," "fixed," "attached," "connected," and the like, refer to both direct coupling, fixing, attaching, or connecting as well as indirect coupling, fixing, attaching, or connecting through one or more intermediate components or features, unless otherwise specified herein.

The singular forms "a," "an," and "the" include plural references unless the context clearly dictates otherwise.

Vehicles include sensor pods connected to the vehicle. The sensor pods gather data and information, communicate with the vehicle, and may assist in navigating the vehicle. In some examples, the vehicles may be autonomous or semi-autonomous. There may be a need for a person at the vehicle to speak with a remote person. In some examples, this may be because no driver is present on the autonomous vehicle. For example, if an autonomous truck is stalled on the side of the road, a technician or a law enforcement officer or other local user may approach. Without a driver (because the vehicle is autonomous), the approaching person needs to communicate with someone through the vehicle.

The present disclosure produces a natural interface through the sensor pod, which is near the front door of the vehicle, to provide a natural way for a local user to interact with a remote user through the vehicle. The present disclosure employs the existing structure of the sensor pod to provide the user interface. The present disclosure may provide a user interface that senses the approach of an individual. Remote access by the remote user to a status of the vehicle may be conveyed to the approaching individual.

Figure 1:
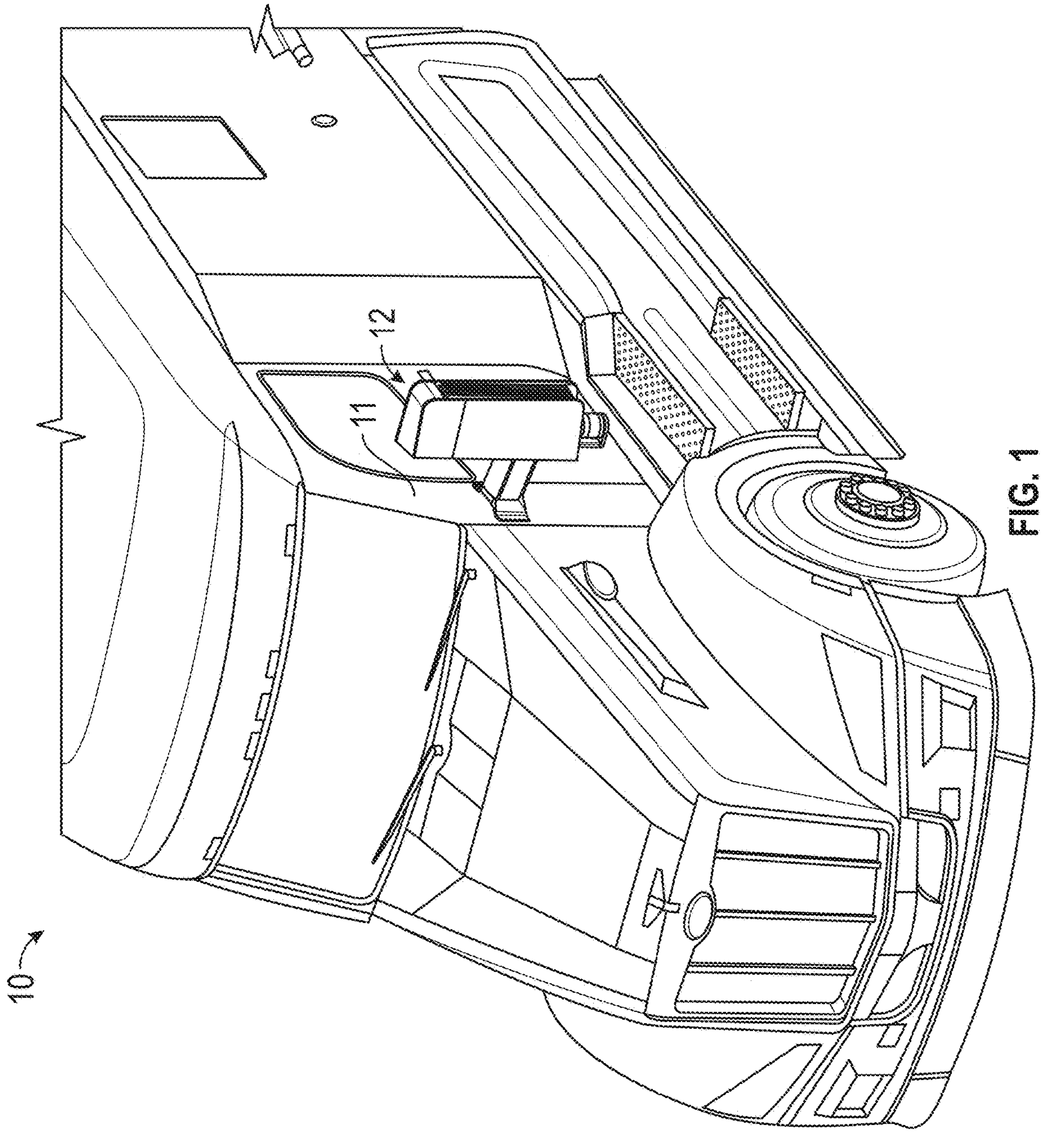
FIG. 1 illustrates a perspective view of a vehicle, according to an embodiment of the present disclosure.
Figure 2:
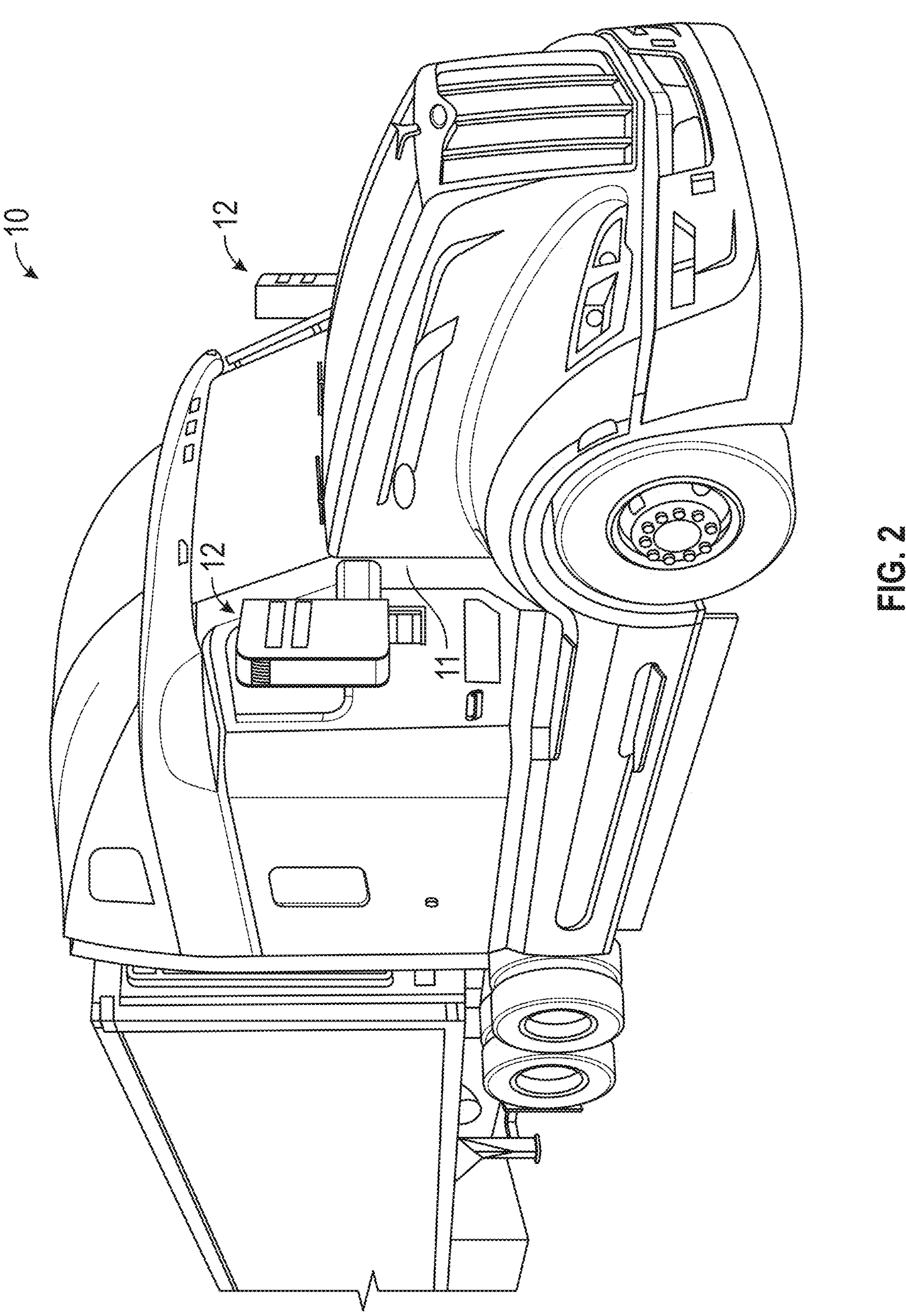
FIG. 2 illustrates a perspective view of a vehicle, according to an embodiment of the present disclosure.

FIGS. 1 and 2 illustrate a vehicle 10 having a sensor pod 12. Although a single sensor pod 12 is illustrated in FIG. 1 and two sensor pods 12 are illustrated in FIG. 2, more or fewer may be provided. The vehicle 10 may be any motor vehicle, such as, for example, but not limited to a car, a truck, a commercial truck, a bus, a watercraft (e.g., boat, ship, underwater vehicles, etc.), a motorcycle, an aircraft (e.g., airplane, helicopter, etc.), or a spacecraft. For ease of description, the vehicle 10 may be referred to herein as a truck 10.

With continued reference to FIGS. 1 and 2, the sensor pod 12 may be a side mirror assembly mounted to the vehicle 10. The sensor pod 12 may assist in navigation of the vehicle 10. In some examples, the sensor pod 12 may assist in navigation in a manner that results in the vehicle 10 being an autonomous or self-driving vehicle or a semi-autonomous vehicle. In this regard, the sensor pod 12 may include, for example, but not limited to, one or more cameras, one or more lidars, one or more radars, one or more inertial measurement units, one or more mirrors, one or more of any sensor type that may be useful for the operation of the vehicle, or any combination thereof. The vehicle 10 may use (via a processor or controller) data collected by the sensor pod 12 to navigate the vehicle 10 and to control the speed, direction, braking, and other functions of the vehicle 10. By way of example, the sensor pod 12 may be the sensor pod described in International Patent Application No. WO 2020/180707, herein incorporated by reference in its entirety. Although illustrated as mounted to the A-pillar 11 of the frame of the vehicle 10 near the driver side and passenger side doors, the sensor pod 12 may be mounted to other locations on the vehicle 10, such as, for example, but not limited to, driver side and/or passenger side doors or other locations on the frame of the vehicle 10. The mounting site of the sensor pod 12 may preferably use existing mounting points for the truck 10, or may mount with appropriate hardware to the truck structure.

Figure 3:
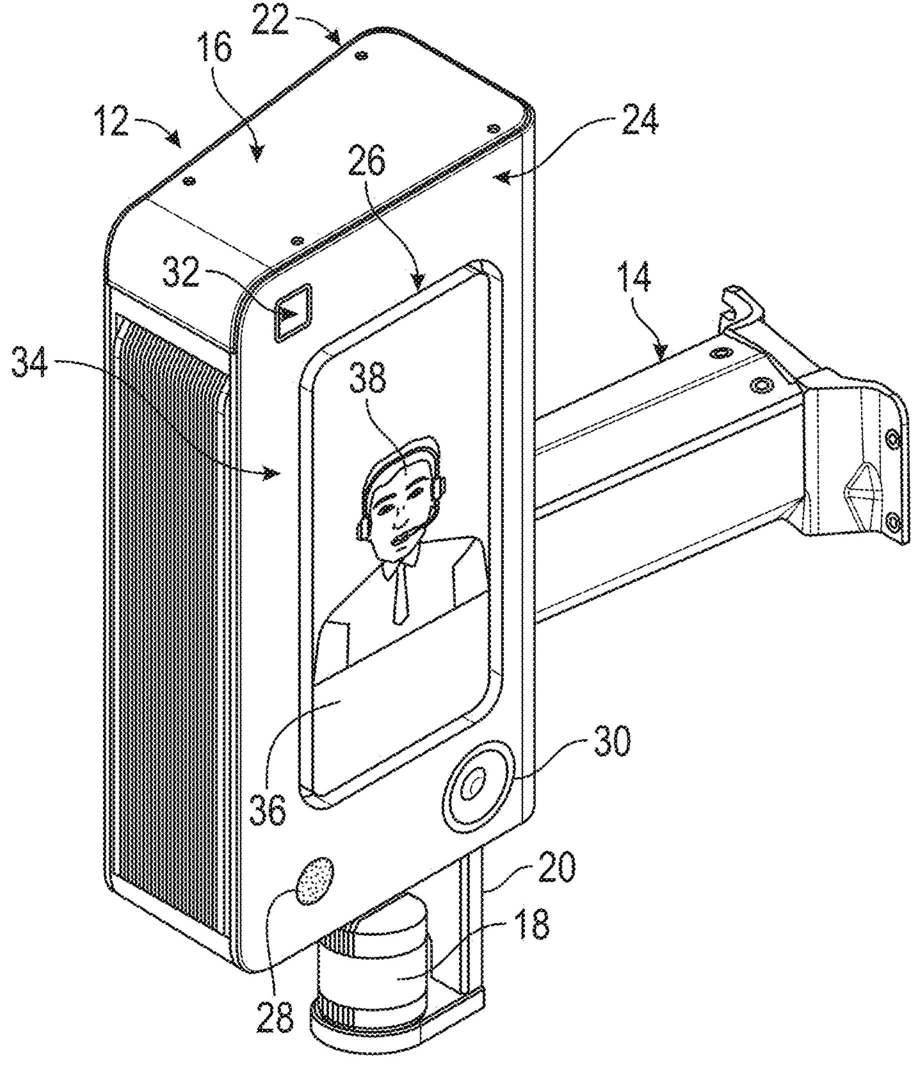
FIG. 3 illustrates a perspective view of a sensor pod with a connecting assembly, according to an embodiment of the present disclosure.

FIG. 3 illustrates the sensor pod 12 coupled to the driver's side of the vehicle 10 (FIG. 1). Alternatively, or additionally, the sensor pod 12 may be that coupled to the passenger's side of the vehicle 10 (FIG. 1). In such an arrangement, it may be understood that the sensor pod 12 takes on a mirror image configuration of that shown and described with respect to FIG. 3.

As shown in FIG. 3, the sensor pod 12 may have a connecting assembly 14 for coupling the sensor pod 12 to the vehicle 10 (FIG. 1). The connecting assembly 14 may be any of the connecting assemblies according to U.S. patent application Ser. No. 17/826,043, herein incorporated by reference in its entirety. The connecting assembly 14 supports the sensor pod 12 with respect to the vehicle 10 (FIG. 1).

The sensor pod 12 has a housing 16. The housing 16 supports the one or more sensors that are provided with the sensor pod 12, for example, the one or more cameras, one or more lidars, one or more radars, one or more inertial measurement units, one or more mirrors, other sensors, and combinations thereof. One or more of the one or more sensors may be contained within the housing 16. One or more of the one or more sensors may be supported outside of the housing 16. For example, a lidar 18 may be supported on a backet 20 extending from an outer surface of the housing 16. The housing 16 may also house one or more microphones 28, one or more speakers 30, and/or one or more cameras 32. The one or more cameras 32 may be the cameras described with respect to autonomous operation in International Patent Application No. WO 2020/180707 and/or the one or more cameras 32 may be separate from the cameras associated with the autonomous operation. As described previously, the housing 16 may support one or more mirrors, which may include mirror 26.

FIG. 3 illustrates the housing 16 having a forward facing surface 22 and a rearward facing surface 24. The forward facing surface 22 faces a direction toward the hood of the vehicle 10 (FIG. 1) and the rearward facing surface 24 faces a direction toward the rear bumper, rear trunk, or trailer of the vehicle 10 (FIG. 1). The mirror 26 is located on the rearward facing surface 24. In accordance with the present disclosure, additional mirrors may be located on other surfaces of the housing 16. The mirror 26 may operate as a side-view mirror for a user occupying the driver's seat of the vehicle 10 (FIG. 1). In some examples, where the sensor pod 12 is located on the passenger side of the vehicle 10 (FIG. 1), the mirror 26 may operate as a side-view mirror for a user occupying the passenger's seat of the vehicle 10 (FIG. 1).

The mirror 26, the microphone 28, the speaker 30, and the camera 32 may provide a user interface 34 for the vehicle 10. The user interface 34 may allow two or more people to interact via the sensor pod 12, as described in more detail to follow. To allow for user interaction, the mirror 26 may include a surface 36 on which an image 38 may be displayed. In some examples, the surface 36 may be both a mirrored surface and display surface such that the surface 36 may be used as both a side-view mirror and a user interface. In some examples, the surface 36 may be divided such that a portion is a mirrored surface and a portion is a display surface such that the surface 36 may be used as both a side-view mirror and a user interface (e.g., a top half is a mirrored surface and a lower half is a user interface). Any configuration that allows a side-view mirror operation and a user interface operation is contemplated. In examples where the surface 36 includes overlapping mirrored surface and display surface, the display surface may be placed behind or in front of the mirrored surface. In some examples, the mirrored surface may be omitted and only a display surface may be provided as the surface 36. In any of the examples described herein, the display surface may include individual light emitting diodes (LEDs), an LED screen, or other display screens commonly used in televisions and computing devices.

Although described on the rearward facing surface 24, the mirror 26 may be alternatively, or additionally, placed on the forward facing surface 22 such as to provide a user interface on the forward facing surface 22 instead of, or in addition to, the rearward facing surface 24. In some examples, there may be multiple user interfaces provided around the vehicle 10. For example, one or more may be provided on the driver's side sensor pod, one or more may be provided on the passenger's side sensor pod, and/or one or more may be provided on additional sensor pods coupled to the vehicle 10. In some examples, the features of the user interface 34 may be provided on the same surface or on different surfaces, or a combination thereof. For example, a speaker 30 may be present on the forward facing surface 22 and the mirror 26 may be present on the rearward facing surface. In another example, a microphone 28 may be present on both the forward facing surface 22 and the rearward facing surface 24. This is merely exemplary and any of the features of the user interface 34 may be present on one or multiple surfaces of the sensor pod 12 that are the same as or different from the surfaces on which the other features of the user interface 34 are located.

Accordingly, the sensor pod 12 of the present disclosure allows two-way communication between an on-site user (also referred to herein as a local user) and an off-site user (also referred to herein as a remote user). An on-site or local user is a person who is physically within the vicinity of the vehicle 10 (FIG. 1), and more particularly, who may be physically located near and/or able to visually see the sensor pod 12 and the user interface 34 thereof. An off-site or remote user is a person who is physically not within the vicinity of the vehicle, that is, the remote user cannot visually see the vehicle 10 and/or the sensor pod 12 with user interface 34.

In examples where the vehicle 10 is autonomous or semi-autonomous, situations may arise where the local user is not the owner or operator of the vehicle 10 or needs to speak with a human associated with the vehicle 10 or needs to speak with a human in regard to the vehicle 10. For example, the local user may be another vehicle operator, law enforcement, fire department personnel, ambulance personnel, technicians, users at the destination or stoppage point of the vehicle 10, the operator of the vehicle 10, etc. In each of these cases, the local user may need or want to talk to remote personnel about the vehicle 10. In one non-limiting example, the local user may be a technician requiring assistance from remote personal. In another non-limiting example, the user may be law enforcement personnel needing to assistance with the vehicle from a safety or law perspective. The user interface 34 is contemplated as being employed in any situation where two-way communication between a user at the vehicle 10 and a user not at the vehicle is required.

In operation, the local user or the remote user may initiate the two-way communication. In some examples, the local user may press a call button (not illustrated) also located on the sensor pod 12. In some examples, the two-way communication is automatically initiated when the sensor pod detects the presence of the local user (e.g., by visual sensing or audio sensing). The sensor pod may alert the remote user that a local user is at the vehicle 10. In some examples, the image or voice of the remote user may alert the local user that a remote user would like to communicate.

Once communication is initiated, the screen or surface 36 of the user interface 34 allows an image 38 to be presented to the local user. The image 38 may be an avatar, video of the remote user, text conveyed by the remote user, or other images, such as documents (e.g., certification documents, technical specifications, diagrams, etc.), or combinations thereof. In this regard, the user interface 34 may operate as a two-way video call or two-way audio call between the local user and the remote user. The local user may speak to the remote user through the microphone 28 and listen to the remote user through the speaker 30. The camera 32 may convey to the remote user video of the local user who is physically at the vehicle 10.

For example, if the local user is a law enforcement officer, a live video stream with the remote user would allow the law enforcement officer to have a conversation with the remote user, providing a more natural communication experience for the officer. If the local user is a technician, the image 38 may display a technical document with instructions and/or diagrams to instruct the technician what the next steps in a repair or inspection of the vehicle. If the surface 36 is interactive, the technician may zoom in or out on the instructions. The technician may also interact with the camera 32 so that the technician may show the remote user any parts or other information to the remote user.

When the necessary communication is ceased, either the remote user or the local user may terminate the two-way communication. The process may be repeatable anytime a local user or remote user is in need of two-way communication.

By using a mirrored panel or surface 36 for the side-view mirror 26, a remote customer support agent or avatar (e.g., the remote user) may be displayed to the approaching person (e.g., the local user). The microphone 28 and speakers 30 on the sensor pod 12 pointed toward the local user provide a more natural interaction with the remote user. The surface 36 may be interactive, for example, a touch screen. The surface 36 may allow the remote user to access information from the vehicle 10. This may be in addition to or in lieu of activating a communication session with the remote user. Additionally, the touch screen may include a call button for the local user to initiate the communication session with the remote user. In some examples, the call button may flash to sense presence of a local user. In some examples, the surface 36 may also display information for technician.

Figure 4:
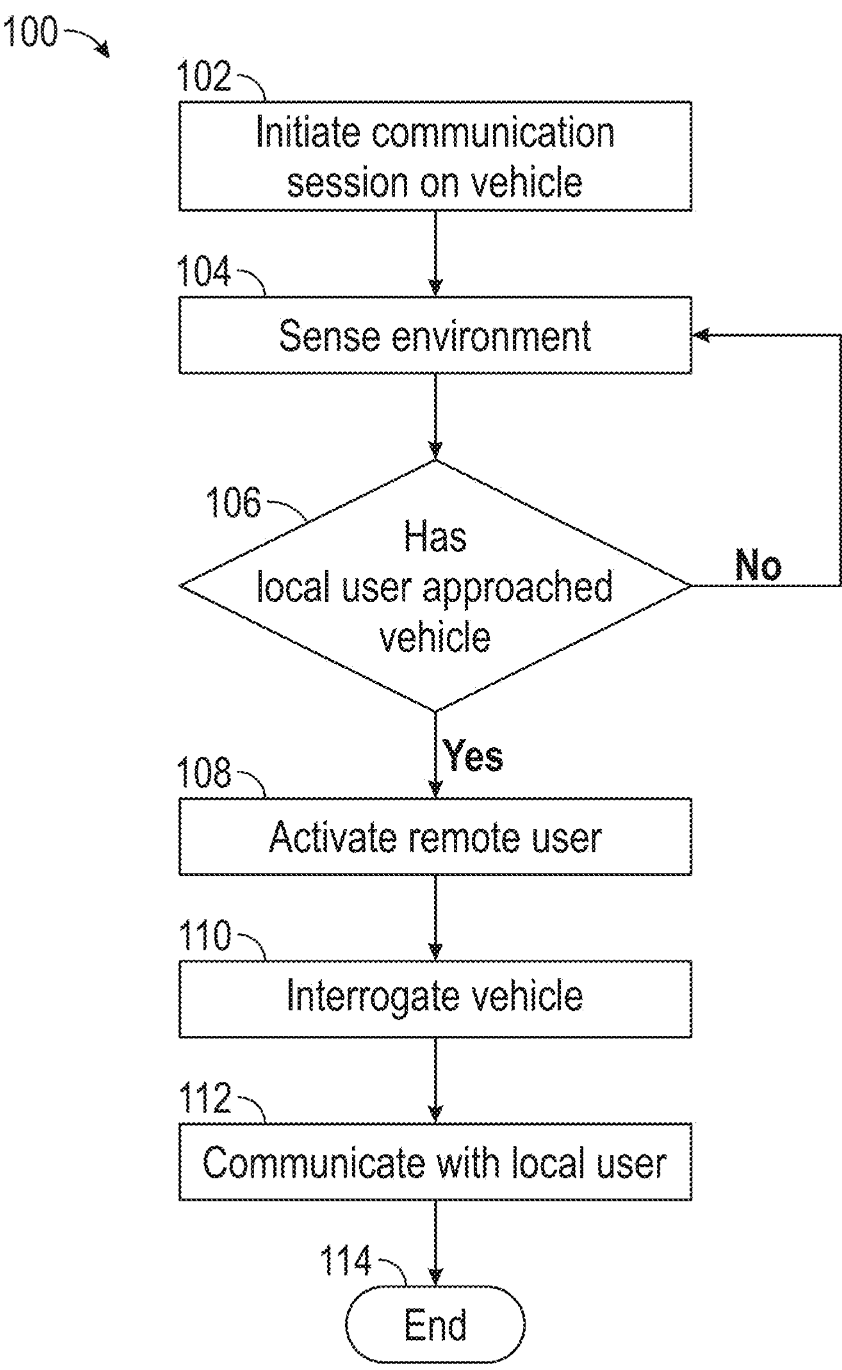
FIG. 4 illustrates a method associated with the user interface, according to an embodiment of the present disclosure.

FIG. 4 illustrates an exemplary method 100 of employing the user interface 34 of the sensor pod 12. In the method 100, step 102 initiates a communication session on the vehicle. The communication session may be initiated because of a local user pressing a call back, based on a scheduled and/or continuous programming of the user interface, as a fallback, due to a technician request, or as part of a launch preparation during dispatch of an autonomous or semi-autonomous vehicle. The communication session may allow the user interface to be on alert and, at step 104, sense the local environment around the sensor pod 12. The sensing may be achieved by any or all of the sensors located with the sensor pod 12. For example, sensing the environment may be a combination of the camera 32 and/or the microphone 28. If step 104 does not detect the presence of a local user, the sensor pod 12 may continue to sense the local environment. When step 104 detects the presence of a local user, at step 106, then the user interface 34 activates the remote user at step 108. The remote user may interrogate the vehicle at step 110. This may involve the remote user accessing vehicle system information, vehicle health status, payload information, navigation plan, etc. At step 112, the remote user may communicate, via the user interface 34, with the local user. Although depicted as following the interrogation of the vehicle at step 110, these steps may be performed in the reverse order or simultaneously. In some examples, communication between the local user and remote user at step 112 may include the remote user providing the local user with access to one or more portions of the vehicle 10. Once communication is no longer needed, the remote user, the local user, or the user interface 34 may end the process at step 114. As mentioned previously, the method may be repeatable such that steps 102 and/or 104 immediately follows step 114.

Accordingly, the system and method of the present disclosure provides a two-way communication system via a user interface on a sensor pod coupled to the vehicle. The user interface facilitates communications between a local user and a remote user. In this manner, issues may be troubleshot, solved, or addressed with the assistance of a remote user. For example, if the vehicle is stopped on the side of the road, or inoperable in a remote location, the local user (technician, law enforcement, etc.) may communicate with the remote user via the user interface. The remote user may assist the local user in fixing or troubleshooting the vehicle, allow access to the vehicle, inform the local user that assistance is coming, etc. Such two-way communication by the user interface takes advantage of the existing sensor pod technology while allowing for communication between an autonomous vehicle and the remote user.

Further aspects are provided by the subject matter of the following clauses.

An autonomous vehicle includes a sensor pod having a mirror, a connecting assembly extending between the sensor pod and the autonomous vehicle, and a user interface provided on the sensor pod. The user interface is configured to provide two-way communication between a local user and a remote user.

The autonomous vehicle of the preceding clause, the sensor pod further including a lidar extending from a lower end of the sensor pod.

The autonomous vehicle of any preceding clause, wherein the mirror is a side-view mirror.

The autonomous vehicle of any preceding clause, the user interface including a camera, a microphone, a speaker, and a display surface.

The autonomous vehicle of any preceding clause, wherein the sensor pod has a forward facing surface and a rearward facing surface, and wherein each of the camera, the microphone, the speaker, and the display surface are provided on the rearward facing surface.

The autonomous vehicle of any preceding clause, wherein the display surface is provided on the mirror.

The autonomous vehicle of any preceding clause, wherein the sensor pod is configured to provide autonomous operation of the autonomous vehicle and the two-way communication through the user interface.

The autonomous vehicle of any preceding clause, wherein the mirror includes a mirrored surface and a display surface such that the mirrored surface is configured as a side-view mirror and the display surface is configured to display an image.

The autonomous vehicle of any preceding clause, wherein the user interface and the mirror are both located on a rearward facing surface of the sensor pod.

The autonomous vehicle of any preceding clause, wherein the sensor pod is coupled to a driver's side of the autonomous vehicle.

The autonomous vehicle of any preceding clause, wherein the sensor pod is configured to automatically initiate the two-way communication upon detection of the local user.

The autonomous vehicle of any preceding clause, wherein the local user initiates the two-way communication by activating a call button.

The autonomous vehicle of any preceding clause, wherein the call button is located on a display surface of the user interface or on a rearward facing surface of the sensor pod.

A sensor pod configured to be coupled to a vehicle, the sensor pod including a forward facing surface and a rearward facing surface, a mirror located on the rearward facing surface, and a user interface having a display surface, the display surface located on the rearward facing surface. The user interface is configured to provide two-way communication between a local user and a remote user.

The sensor pod of the preceding clause, the user interface further including a microphone, a speaker, and a camera.

The sensor pod of any preceding clause, wherein each of the microphone, the speaker, and the camera are provided on the rearward facing surface.

The sensor pod of any preceding clause, wherein the camera provides autonomous navigation of the vehicle and provides a visual image of the local user to the remote user.

The sensor pod of any preceding clause, wherein the display surface is located on the mirror such that the mirror includes the display surface and a mirrored surface.

The sensor pod of any preceding clause, further including a lidar located on a bracket extending from a lower end of the sensor pod.

The sensor pod of any preceding clause, wherein the sensor pod is configured to provide autonomous operation of the vehicle and the two-way communication through the user interface.

The sensor pod of any preceding clause, wherein the sensor pod is configured to automatically initiate the two-way communication upon detection of the local user.

The sensor pod of any preceding clause, wherein the local user initiates the two-way communication by activating a call button.

The sensor pod of any preceding clause, wherein the call button is located on the display surface of the user interface or on the rearward facing surface of the sensor pod.

A method for two-way communication, including providing a vehicle with a sensor pod and initiating two-way communication between a local user and a remote user via the sensor pod.

The method of the preceding clause, wherein initiating the two-way communication between the local user and the remote user includes the local user activating a call button on the sensor pod.

The method of any preceding clause, wherein initiating the two-way communication between the local user and the remote user includes sensing an environment around the vehicle to detect a presence of the local user and initiating the two-way communication automatically when the presence of the local user is detected.

The method of any preceding clause, wherein sensing the environment around the vehicle is continuous until the presence of the local user is detected.

The method of any preceding clause, wherein sensing the environment includes detecting for visual presence of the local user with a camera.

The method of any preceding clause, wherein sensing the environment includes detecting for audio presence of the local user with a microphone.

The method of any preceding clause, wherein initiating the two-way communication further includes alerting the remote user to initiate a communication session.

The method of any preceding clause, further including displaying an image on the sensor pod during the two-way communication.

The method of any preceding clause, wherein the image is an avatar, video of the remote user, text, or documents provided by the remote user.

The method of any preceding clause, further including providing the sensor pod with a side-view mirror, wherein the image is displayed on the side-view mirror.

The method of any preceding clause, further including providing the sensor pod with a user interface configured to conduct the two-way communication.

The method of any preceding clause, wherein the user interface includes a display surface, a microphone, a speaker, and a camera.

The method of any preceding clause, wherein the local user sees the remote user or information provided by the remote user on the display surface.

The method of any preceding clause, wherein the local user hears the remote user or information provided by the remote user with the speaker.

The method of any preceding clause, wherein the remote user sees the local user with the camera and hears audio from the local user provided via the microphone.

The method of any preceding clause, wherein the user interface is provided on a rearward facing surface of the sensor pod.

The method of any preceding clause, wherein the vehicle is an autonomous vehicle.

The method of any preceding clause, further including providing autonomous operation of the vehicle with the sensor pod.

The method of any preceding clause, wherein the sensor pod automatically initiates the two-way communication between the local user and the remote user.

The method of any preceding clause, further including providing the sensor pod with a side-view mirror and a user interface, both located on a rearward facing surface of the sensor pod, wherein a display surface of the user interface is located on the side-view mirror.

Although the foregoing description is directed to the preferred embodiments, it is noted that other variations and modifications will be apparent to those skilled in the art and may be made without departing from the spirit or scope of the disclosure. Moreover, features described in connection with one embodiment may be used in conjunction with other embodiments, even if not explicitly stated above.

The invention claimed is:

1. An autonomous vehicle, comprising:

a sensor pod having a mirror and one or more sensors, the sensor pod being external to the autonomous vehicle;

a connecting assembly extending between the sensor pod and the autonomous vehicle; and a user interface provided on the sensor pod, wherein the sensor pod is configured to:

detect a presence of a local user in front of the user interface of the sensor pod external to the autonomous vehicle with at least one of the one or more sensors, the local user being a human;

upon detecting the presence of the local user in front of the user interface of the sensor pod external to the autonomous vehicle, initiate, with the user interface, two-way communication between the local user and a remote user;

provide access to one or more systems of the autonomous vehicle to the remote user through the two-way communication; and interrogate the one or more systems of the autonomous vehicle through the two-way communication.

2. The autonomous vehicle of claim 1, wherein the one or more sensors include a lidar extending from a lower end of the sensor pod.

3. The autonomous vehicle of claim 1, wherein the mirror is a side-view mirror.

4. The autonomous vehicle of claim 1, wherein the user interface comprising a camera, a microphone, a speaker, and a display surface.

5. The autonomous vehicle of claim 4, wherein the sensor pod has a forward facing surface and a rearward facing surface, and wherein each of the camera, the microphone, the speaker, and the display surface are provided on the rearward facing surface.

6. The autonomous vehicle of claim 4, wherein the display surface is provided on the mirror.

7. The autonomous vehicle of claim 1, wherein the sensor pod is configured to provide autonomous operation of the autonomous vehicle and the two-way communication through the user interface.

8. The autonomous vehicle of claim 1, wherein the mirror comprises a mirrored surface and a display surface such that the mirrored surface is configured as a side-view mirror and the display surface is configured to display an image.

9. The autonomous vehicle of claim 1, wherein the user interface and the mirror are both located on a rearward facing surface of the sensor pod.

10. The autonomous vehicle of claim 1, wherein the sensor pod is coupled to a driver's side of the autonomous vehicle.

11. The autonomous vehicle of claim 1, wherein the sensor pod is configured to automatically initiate the two-way communication upon detection of the local user.

12. The autonomous vehicle of claim 1, wherein the sensor pod includes a call button that is configured to initiate the two-way communication upon activation of the call button.

13. The autonomous vehicle of claim 12, wherein the call button is located on a display surface of the user interface or on a rearward facing surface of the sensor pod.

14. A sensor pod configured to be coupled to an exterior of a vehicle, the sensor pod comprising:

a forward facing surface and a rearward facing surface;

a mirror located on the rearward facing surface;

one or more sensors; and a user interface having a display surface, the display surface located on the rearward facing surface, wherein the sensor pod is configured to:

detect a presence of a local user in front of the user interface of the sensor pod external to the vehicle with at least one of the one or more sensors, the local user being a human; and upon detecting the presence of the local user in front of the user interface of the sensor pod external to the vehicle, initiate, with the user interface, two-way communication between the local user and a remote user;

provide access to one or more systems of the vehicle to the remote user through the two-way communication; and interrogate the one or more systems of the vehicle through the two-way communication.

15. The sensor pod of claim 14, wherein the user interface further comprises a microphone, a speaker, and a camera.

16. The sensor pod of claim 15, wherein each of the microphone, the speaker, and the camera are provided on the rearward facing surface.

17. The sensor pod of claim 15, wherein the camera provides autonomous navigation of the vehicle and provides a visual image of the local user to the remote user.

18. The sensor pod of claim 14, wherein the display surface is located on the mirror such that the mirror comprises the display surface and a mirrored surface.

19. The sensor pod of claim 14, wherein the one or more sensors include a lidar located on a bracket extending from a lower end of the sensor pod.

20. The sensor pod of claim 14, wherein the sensor pod is configured to provide autonomous operation of the vehicle and the two-way communication through the user interface.

21. The sensor pod of claim 14, wherein the sensor pod is configured to automatically initiate the two-way communication upon detection of the local user.

22. The sensor pod of claim 14, wherein the sensor pod includes a call button that is configured to initiate the two-way communication upon activation of the call button.

23. The sensor pod of claim 22, wherein the call button is located on the display surface of the user interface or on the rearward facing surface of the sensor pod.

* * * * *